(12) United States Patent
Endo et al.

(10) Patent No.: US 10,787,194 B2
(45) Date of Patent: Sep. 29, 2020

(54) POWER SYSTEM

(71) Applicant: HONDA MOTOR CO., LTD., Tokyo (JP)

(72) Inventors: Rintaro Endo, Saitama (JP); Taku Ueda, Saitama (JP); Keiichiro Kashiwabara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/289,884

(22) Filed: Mar. 1, 2019

(65) Prior Publication Data
US 2019/0270477 A1     Sep. 5, 2019

(30) Foreign Application Priority Data
Mar. 5, 2018   (JP) ................................ 2018-039134

(51) Int. Cl.
*B62D 5/04*     (2006.01)
*B62D 5/00*     (2006.01)
(Continued)

(52) U.S. Cl.
CPC ........... *B62D 5/0418* (2013.01); *B62D 5/046* (2013.01); *B62D 1/166* (2013.01); *B62D 5/008* (2013.01); *B62D 15/0235* (2013.01)

(58) Field of Classification Search
CPC ...... B62D 5/0418; B62D 5/046; B62D 1/166; B62D 5/008; B62D 15/0235
See application file for complete search history.

(56) References Cited

U.S. PATENT DOCUMENTS 1,858,506 A * 5/1932 Jacobs ..................... B60K 1/02
                                                        180/65.6
5,372,213 A * 12/1994 Hasebe .................... B60K 1/02
                                                        180/65.6
(Continued)

FOREIGN PATENT DOCUMENTS

JP     H05-278406 A     10/1993
JP     2000-310296 A    11/2000
(Continued)

OTHER PUBLICATIONS

Jul. 23, 2019, Japanese Office Action issued for related JP Application No. 2018-039134.

*Primary Examiner* — Jacob B Meyer
(74) *Attorney, Agent, or Firm* — Paratus Law Group, PLLC (57) ABSTRACT

A power system includes an electric motor for driving a left wheel and a right wheel of a vehicle, an electric motor control device for controlling the electric motor, a transmission disposed on a power transmission path between the electric motor, the left and right wheels, a differential device for distributing output decelerated by the transmission to the left and right wheels, a case which accommodates the electric motor, the transmission, and the differential device, a left axle of which one end is connected to the differential device and the other end extends from the case to be connected to the left wheel, and a right axle of which one end is connected to the differential device and the other end extends from the case to be connected to the right wheel. A conductive rotation allowing member having conductivity is provided between the differential device and the case.

4 Claims, 4 Drawing Sheets

(51) Int. Cl.
*B62D 1/16* (2006.01)
*B62D 15/02* (2006.01)

(56) References Cited

U.S. PATENT DOCUMENTS

| | | | | |
|---|---|---|---|---|
| 5,396,968 A * | 3/1995 | Hasebe | ............... | B60K 1/02 180/65.6 |
| 5,419,406 A * | 5/1995 | Kawamoto | ............... | B60K 1/02 180/65.6 |
| 5,528,094 A * | 6/1996 | Hasebe | ............... | B60K 1/00 310/112 |
| 5,996,701 A * | 12/1999 | Fukasawa | ............... | E02F 9/2235 172/2 |
| 6,026,921 A * | 2/2000 | Aoyama | ............... | B60K 6/48 180/65.25 |
| 6,327,935 B1 * | 12/2001 | Joslin | ............... | B60K 17/02 74/650 |
| 6,398,685 B1 * | 6/2002 | Wachauer | ............... | B60K 1/00 475/149 |
| 6,557,677 B2 * | 5/2003 | Peura | ............... | F16D 41/088 180/247 |
| 7,084,539 B2 * | 8/2006 | Forster | ............... | B60K 7/0007 310/112 |
| 7,112,155 B2 * | 9/2006 | Keuth | ............... | B60K 1/02 475/6 |
| 7,224,079 B2 * | 5/2007 | Kanazawa | ............... | H02J 7/1492 290/40 B |
| 7,276,005 B2 * | 10/2007 | Morikawa | ............... | B60K 17/046 475/5 |
| 7,276,016 B2 * | 10/2007 | Ishii | ............... | B60W 10/06 477/115 |
| 7,471,004 B2 * | 12/2008 | Kanazawa | ............... | H02J 7/1492 290/40 B |
| 7,726,425 B2 * | 6/2010 | Ishii | ............... | A01D 69/03 180/53.4 |
| 8,479,851 B2 * | 7/2013 | Mack | ............... | H02K 7/003 180/65.6 |
| 8,641,568 B2 * | 2/2014 | Knoblauch | ............... | B60K 1/02 180/65.6 |
| 8,827,866 B2 * | 9/2014 | Nakanishi | ............... | B60W 30/18 477/5 |
| 9,026,295 B2 * | 5/2015 | Inoue | ............... | B60W 20/40 701/22 |
| 9,031,727 B2 * | 5/2015 | Miyazaki | ............... | B60W 10/18 701/22 |
| 9,079,583 B2 * | 7/2015 | Miyazaki | ............... | F16D 48/06 |
| 9,108,635 B2 * | 8/2015 | Miyazaki | ............... | B60K 6/48 |
| 9,127,765 B2 * | 9/2015 | Eto | ............... | B60W 20/40 |
| 9,145,961 B2 * | 9/2015 | Suzuki | ............... | B60K 6/448 |
| 9,154,021 B2 * | 10/2015 | Soeda | ............... | B60L 50/51 |
| 9,180,876 B2 * | 11/2015 | Tsutsumi | ............... | B60W 20/40 |
| 9,205,832 B2 * | 12/2015 | Tsutsumi | ............... | B60W 20/40 |
| 9,409,569 B2 * | 8/2016 | Nakanishi | ............... | B60K 6/48 |
| 9,776,620 B2 * | 10/2017 | Minamikawa | ...... | B60L 15/2054 |
| 9,834,201 B2 * | 12/2017 | Inoue | ............... | B60K 6/48 |
| 10,518,627 B2 * | 12/2019 | Nagpal | ............... | B60K 7/0007 |
| 2003/0192762 A1 * | 10/2003 | Peura | ............... | F16D 41/088 192/36 |
| 2005/0282682 A1 * | 12/2005 | Ishii | ............... | B60W 10/06 477/107 |
| 2006/0006655 A1 * | 1/2006 | Kanazawa | ............... | H02J 7/1492 290/40 B |
| 2006/0157291 A1 * | 7/2006 | Puiu | ............... | B60K 23/04 180/247 |
| 2007/0200346 A1 * | 8/2007 | Kanazawa | ............... | H02J 7/1492 290/40 B |
| 2008/0153649 A1 * | 6/2008 | Puiu | ............... | B60K 23/04 475/84 |
| 2012/0142474 A1 * | 6/2012 | Troennberg | ............... | B60K 1/00 475/149 |
| 2012/0142487 A1 * | 6/2012 | Winter | ............... | B60K 1/00 475/332 |
| 2013/0192400 A1 * | 8/2013 | Dodo | ............... | B60K 1/00 74/421 A |
| 2013/0241342 A1 * | 9/2013 | Soeda | ............... | H02K 11/40 310/239 |
| 2013/0288853 A1 * | 10/2013 | Miyazaki | ............... | B60K 6/48 477/5 |
| 2014/0080663 A1 * | 3/2014 | Nakanishi | ............... | B60W 30/18 477/5 |
| 2014/0094340 A1 * | 4/2014 | Yoshikawa | ............... | B60W 20/10 477/5 |
| 2014/0129066 A1 * | 5/2014 | Inoue | ............... | B60W 20/40 701/22 |
| 2014/0148985 A1 * | 5/2014 | Sato | ............... | B60W 20/00 701/22 |
| 2014/0162839 A1 * | 6/2014 | Miyazaki | ............... | B60W 20/40 477/5 |
| 2014/0172217 A1 * | 6/2014 | Miyazaki | ............... | B60K 6/445 701/22 |
| 2014/0182954 A1 * | 7/2014 | Weber | ............... | B60K 17/16 180/65.7 |
| 2014/0222269 A1 * | 8/2014 | Tsutsumi | ............... | B60W 20/40 701/22 |
| 2014/0222270 A1 * | 8/2014 | Tsutsumi | ............... | B60W 20/40 701/22 |
| 2014/0244091 A1 * | 8/2014 | Eto | ............... | B60W 20/40 701/22 |
| 2015/0065297 A1 * | 3/2015 | Hoshiba | ............... | B60W 10/026 477/19 |
| 2015/0119181 A1 * | 4/2015 | Fox | ............... | B60K 1/00 475/150 |
| 2015/0175155 A1 * | 6/2015 | Nakanishi | ............... | B60W 10/02 477/181 |
| 2015/0239468 A1 * | 8/2015 | Nakanishi | ............... | B60K 6/48 477/167 |
| 2015/0274013 A1 * | 10/2015 | Matsuda | ............... | B60K 1/04 180/242 |
| 2015/0329106 A1 * | 11/2015 | Kuwahara | ............... | B60K 6/48 477/5 |
| 2016/0144849 A1 * | 5/2016 | Minamikawa | ...... | B60L 15/2054 701/22 |
| 2018/0178774 A1 * | 6/2018 | Katsumata | ............... | B60W 10/105 |
| 2019/0039598 A1 * | 2/2019 | Kumazaki | ............... | G05D 1/021 |
| 2019/0270477 A1 * | 9/2019 | Endo | ............... | F16C 19/06 |

FOREIGN PATENT DOCUMENTS

| | | |
|---|---|---|
| JP | 2002-104001 A | 4/2002 |
| JP | 2006-320129 A | 11/2006 |
| JP | 2016-105693 A | 6/2016 |

* cited by examiner

POWER SYSTEM

CROSS-REFERENCE TO RELATED APPLICATIONS

The present application claims the benefit of priority of Japanese Patent Application No. 2018-039134, filed on Mar. 5, 2018, the content of which is incorporated herein by reference.

TECHNICAL FIELD

The present invention relates to a power system provided in an electric vehicle.

BACKGROUND ART

JP-A-2002-104001 discloses a power system which includes an electric motor for driving a left wheel and a right wheel of a vehicle, a transmission disposed on a power transmission path between the electric motor, the left wheel, and the right wheel, and a differential device for distributing output speed-changed by the transmission to the left wheel and the right wheel. In this type of power system, noise current generated from an inverter for controlling the electric motor is transmitted to an axle and noises (hereinafter, also referred to as radio noises) may be radiated by the axle as an antenna.

As a countermeasure against this radio noise, in JP-A-2016-105693, for example, a sliding-contact brush is disposed on a shaft element of a power transmission mechanism to be installed on a vehicle body.

However, in the countermeasure against the radio noise disclosed in JP-A-2016-105693, it is necessary to additionally secure a space for providing the sliding-contact brush and maintenance of the sliding-contact brush is necessary.

SUMMARY

The present invention provides a power system which requires no maintenance and can suppress generation of noise.

According to a first aspect of the present invention, there is provided:

a power system including:

an electric motor for driving a left wheel and a right wheel of a vehicle;

an electric motor control device for controlling the electric motor;

a transmission disposed on a power transmission path between the electric motor, the left wheel and the right wheel;

a differential device for distributing output decelerated by the transmission to the left wheel and the right wheel;

a case which accommodates the electric motor, the transmission, and the differential device;

a left axle of which one end is connected to the differential device and the other end extends from the case to be connected to the left wheel; and a right axle of which one end is connected to the differential device and the other end extends from the case to be connected to the right wheel, wherein a conductive rotation allowing member having conductivity is provided between at least one of the left axle and the right axle and the case, and the conductive rotation allowing member is a bearing or an oil seal.

According to a second aspect of the present invention, there is provided:

a power system comprising:

an electric motor for driving a left wheel and a right wheel of a vehicle;

an electric motor control device for controlling the electric motor;

a transmission disposed on a power transmission path between the electric motor, the left wheel and the right wheel;

a differential device for distributing output decelerated by the transmission to the left wheel and the right wheel;

a case which accommodates the electric motor, the transmission, and the differential device;

a left axle of which one end is connected to the differential device and the other end extends from the case to be connected to the left wheel; and a right axle of which one end is connected to the differential device and the other end extends from the case to be connected to the right wheel, wherein a conductive rotation allowing member having conductivity is provided between the differential device and the case, and the conductive rotation allowing member is a bearing or an oil seal.

EFFECTS

According to the first aspect of the present invention, since the conductive rotation allowing member having conductivity is provided between the case and the axle, it is possible to prevent the noise generated from the electric motor control device from being radiated. Also, since the rotation of the axle is decelerated by the transmission, the influence of friction can be reduced. Further, since the conductive rotation allowing member is the bearing or the oil seal, it is possible to avoid an increase in the number of parts as a countermeasure against radio noise and maintenance is not necessary compared with a case of a sliding-contact brush.

According to the second aspect of the present invention, since the conductive rotation allowing member having conductivity is provided between the case and the differential device, it is possible to prevent the noise generated from the electric motor control device from being radiated. Also, since the rotation of the differential device is decelerated by the transmission, the influence of friction can be reduced. Further, since the conductive rotation allowing member is the bearing or the oil seal, it is possible to avoid an increase in the number of parts as a countermeasure against radio noise and maintenance is not necessary compared with a case of a sliding-contact brush.

DESCRIPTION OF EMBODIMENTS

Figure 1:
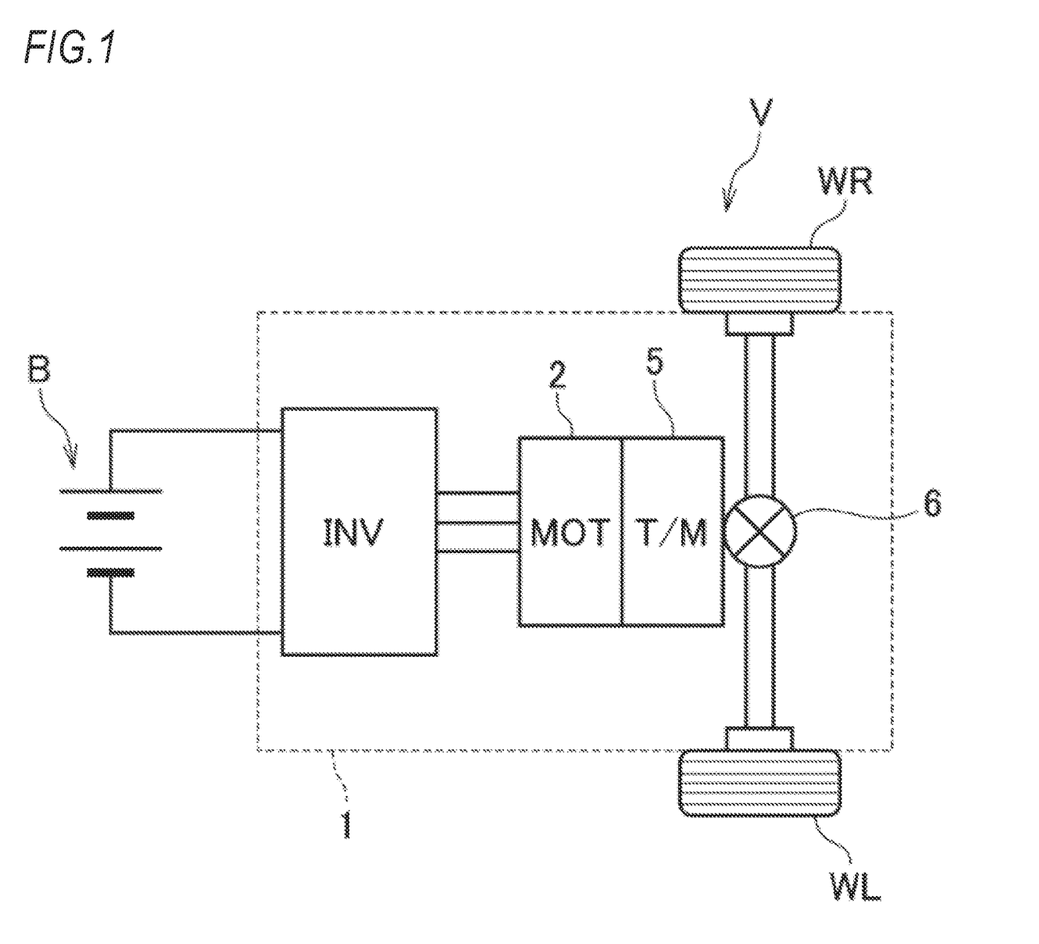
FIG. 1 is a schematic diagram illustrating an outline of a part of a vehicle on which a power system of an embodiment of the present invention is mounted.

First, a vehicle V on which a power system 1 of an embodiment of the present invention is mounted will be described with reference to FIG. 1. The vehicle V is an electric vehicle which uses an electric motor 2 as a drive source, and the power system 1 is provided in the electric vehicle such as a hybrid vehicle and an electric car as a front wheel drive device or a rear wheel drive device. As illustrated in FIG. 1, a battery B and the power system 1 are mounted on the vehicle V and the battery B and the electric motor 2 are electrically connected via an inverter INV controlling the electric motor 2, and further the electric motor 2 and a left wheel WL and a right wheel WR are mechanically connected via a transmission 5 and a differential device 6.

Power System

Hereinafter, an embodiment of the power system 1 according to the invention will be described with reference to FIG. 2.

Figure 2:
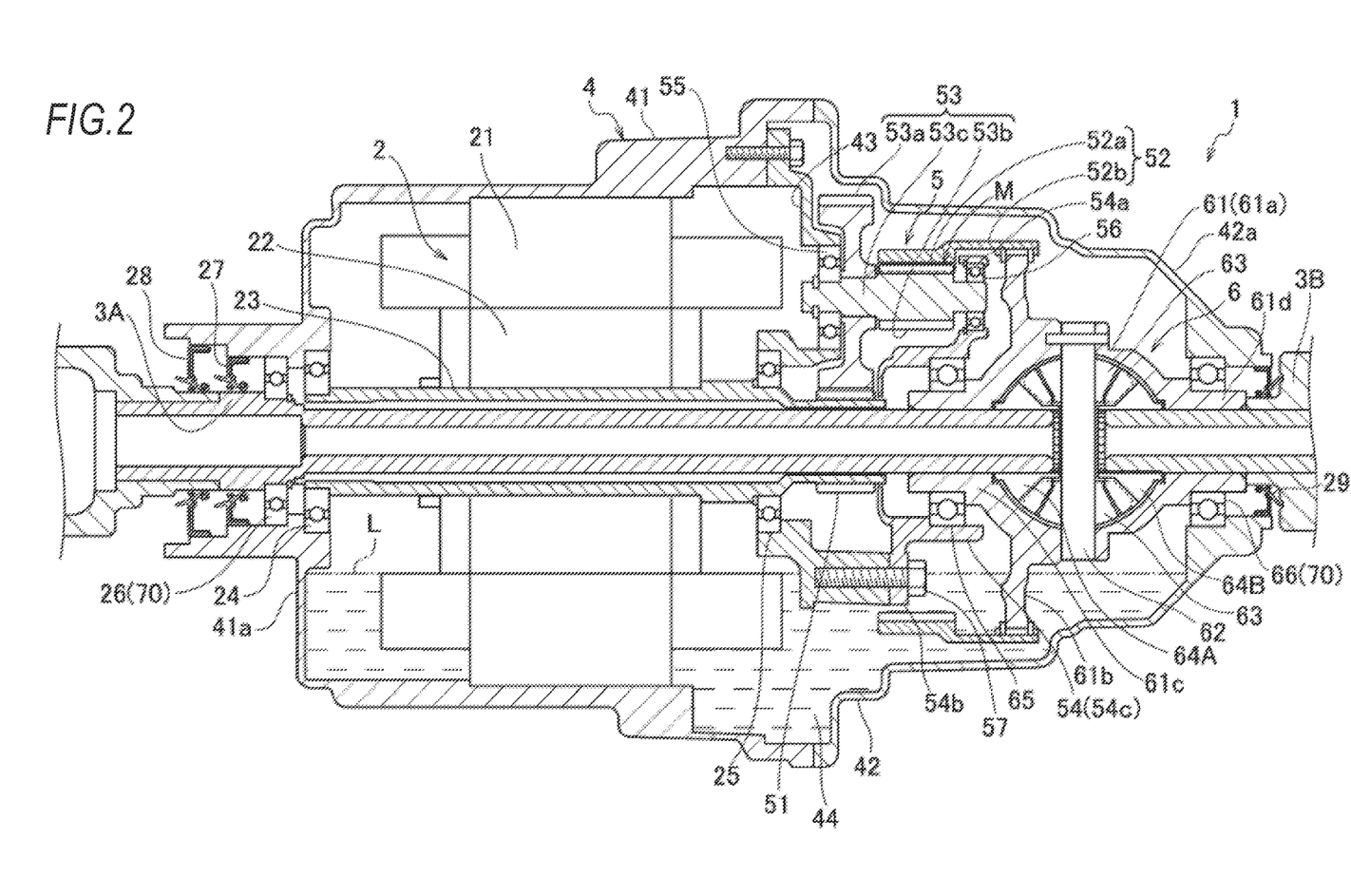
FIG. 2 is a cross-sectional view of the power system according to an embodiment of the present invention.

In FIG. 2, reference numerals and characters 3A and 3B indicate left and right axles connected to the left and right wheels WL and WR, respectively, and are disposed coaxially along a vehicle width direction. The entirety of a case 4 of the power system 1 is formed in a substantially cylindrical shape. In the case 4, the electric motor 2 for driving the vehicle, the transmission 5 for decelerating the drive rotation of the electric motor 2, and the differential device 6 for distributing the drive rotation decelerated by the transmission 5 to the left and right axles 3A and 3B are arranged.

The case 4 includes a first case 41 for accommodating the electric motor 2 and a second case 42 for accommodating the transmission 5 and the differential device 6. A partition wall 43 is provided at a boundary between the first case 41 and the second case 42 and an internal space of the first case 41 and an internal space of the second case 42 are partitioned by the partition wall 43. A bottom portion of the case 4 functions as a storage portion 44 for storing lubricating oil and the lubricating oil is stored up to an oil level indicated by reference character L.

Electric Motor

The electric motor 2 includes a stator 21 which is fixed to an inner circumferential portion of the first case 41 and a rotor 22 which is rotatably disposed on an inner circumferential side of the stator 21. A rotor shaft 23 surrounding an outer circumference of the left axle 3A is coupled to an inner circumferential portion of the rotor 22 and the rotor shaft 23 is supported by an end portion wall 41a of the case 41 and the partition wall 43 via bearings 24 and 25 so that the rotor shaft 23 can be relatively rotated coaxially with the left axle 3A. Further, one end sides of the left axle 3A and the rotor shaft 23 pass through the partition wall 43 and extend to the inside of the second case 42, and the other end side of the left axle 3A passes through the end portion wall 41a of the first case 41 and extends to the outside of the case 4. The electric motor 2 is electrically connected to the inverter INV provided outside the case 4.

Transmission

The transmission 5 includes a first gear 51 which is mechanically connected to the electric motor 2, a second gear 52 which has the same rotation axis as the first gear 51 and is mechanically connected to a differential case 61 of the differential device 6, a plurality of pinion gears 53 which mesh with the first gear 51 and the second gear 52, and a pinion holder 54 which supports the plurality of pinion gears 53 to rotate freely and not to revolve. When the drive rotation of the electric motor 2 is input from the first gear 51, the drive rotation decelerated via the pinion gear 53 and the second gear 52 is output to the differential case 61 of the differential device 6.

The first gear 51 is formed of an external gear and is integrally formed with the rotor shaft 23. The pinion gear 53 includes a large-diameter gear 53a formed of an external gear, a small-diameter gear 53b formed of an external gear, and a pinion shaft 53c which supports the large-diameter gear 53a and the small-diameter gear 53b such that the large-diameter gear 53a and the small-diameter gear 53b are integrally rotatable. The large-diameter gear 53a is coupled to the pinion shaft 53c on a side of the electric motor 2 and meshes with the first gear 51. The small-diameter gear 53b is integrally formed on the pinion shaft 53c on a side of the differential device 6 and meshes with the second gear 52. In the pinion shaft 53c, the end portion on the side of the electric motor 2 is rotatably supported by the partition wall 43 via a bearing 55 and the end portion on the side of the differential device 6 is rotatably supported by a pinion gear support portion 54a of the pinion holder 54 via a bearing 56.

The transmission 5 of the embodiment includes, for example, three pinion gears 53 and the three pinion gears 53 are arranged at equal intervals (120° intervals) in a circumferential direction with the first gear 51 as a center.

In the second gear 52, a gear portion 52a is formed of an internal gear and meshes with the small-diameter gear 53b of the pinion gear 53. The second gear 52 includes a connecting portion 52b which extends from the gear portion 52a to the side of the differential device 6 across an outer circumferential side of the pinion holder 54 (pinion gear support portion 54a) and the connecting portion 52b is mechanically connected to the differential case 61 of the differential device 6 via connecting means such as a spline or the like.

The pinion holder 54 includes three pinion gear support portions 54a which rotatably support the pinion shafts 53c of the pinion gears 53 via the bearings 56, three fixed portions 54b fixed to the partition wall 43, and a cylindrical portion 54c which is formed at a center portion (an inner diameter side of the pinion gear support portion 54a and the fixed portion 54b) of the pinion holder 54.

The pinion gear support portion 54a is disposed further on the side of the differential case 61 of the differential device 6 compared to a meshing portion M between the second gear 52 mechanically connected to the differential case 61 of the differential device 6 and the small-diameter gear 53b of the pinion gear 53. Therefore, the other end side of the pinion shaft 53c of which one end side is supported by the partition wall 43 via the bearing 55 is supported by the pinion gear support portion 54a via the bearing 56, and thus it is possible to appropriately support the pinion gear 53 in a state where both sides of the pinion gear 53 are supported.

The three fixed portions 54b are located in middle portions of the adjacent pinion gear support portions 54a in the circumferential direction and each of the fixed portions 54b is fastened to the partition wall 43 via a bolt 57. As a result, the partition wall 43 is also used as a support member of the pinion shaft 53c and a support member of the pinion holder 54.

The cylindrical portion 54c rotatably supports one end side of the differential case 61 via a bearing 65. As a result, the pinion holder 54 is also used as a support member of the pinion gear 53 and a support member of the differential case 61.

Differential Device

The differential device 6 includes the differential case 61, a differential pinion shaft 62, a differential pinion gear 63, and left and right side gears 64A and 64B to distribute the drive rotation input to the differential case 61 from the second gear 52 to the left and right axles 3A and 3B and allow the difference in rotation between the left and right axles 3A and 3B.

The differential case 61 includes a differential case main body 61a of a spherical shape which accommodates the differential pinion shaft 62, the differential pinion gear 63, and the left and right side gears 64A and 64B, an input plate 61b which extends in a radial direction from an outer circumferential portion of the differential case main body 61a to be mechanically connected to the second gear 52, and left and right extending portions 61c and 61d which extend in the axial direction from both side portions of the differential case main body 61a. One extending portion 61c supports the left axle 3A to be rotatable at the inner circumferential portion and the outer circumferential portion thereof is rotatably supported by the pinion holder 54 via the bearing 65. The other extending portion 61d supports the right axle 3B to be rotatable at the inner circumferential portion and the outer circumferential portion thereof is rotatably supported by an end portion wall 42a of the second case 42 via a bearing 66.

The differential pinion shaft 62 is supported by the differential case main body 61a to be directed in a direction perpendicular to the axles 3A and 3B and supports two differential pinion gears 63 to be rotatable which are formed of bevel gears inside the differential case main body 61a. That is, the differential pinion shaft 62 allows the differential pinion gear 63 to rotate while revolving the differential pinion gear 63 according to the rotation of the differential case 61.

The left and right side gears 64A and 64B are formed of bevel gears and are rotatably supported inside the differential case main body 61a to mesh with the differential pinion gears 63 from both sides and mechanically connected to the left and right axles 3A and 3B via connecting means such as a spline. In a state, for example, during straight travelling, where the differential pinion gear 63 revolves without rotating, the left and right side gears 64A and 64B rotate at an equal speed and the drive rotation thereof is transmitted to the left and right axles 3A and 3B. When a vehicle travels on a curve or turns right or left, the differential pinion gear 63 rotates, so that the left and right side gears 64A and 64B relatively rotate. As a result, the difference in rotation between the left and right axles 3A and 3B is allowed.

One end of the left axle 3A is rotatably supported by a bearing 26 provided in the end portion wall 41a of the first case 41 and the other end is rotatably supported by the extending portion 61c of the differential case 61. In a portion between the left axle 3A and the end portion wall 41a, two oil seals 27 and 28 for sealing a space between the left axle 3A and the end portion wall 41a are provided on further outer side compared to the bearing 26. In addition, an oil seal 29 for sealing a space between the right axle 3B and the end portion wall 42a is also provided between the right axle 3B and the end portion wall 42a.

In the power system 1 configured as described above, as described above, noise current generated from the inverter INV which controls the electric motor 2 is transmitted to the left and right axles 3A and 3B and radio noises may be radiated by the left and right axles 3A and 3B as antennas. Therefore, radio noise countermeasure is applied to the power system 1. Hereinafter, the radio noise countermeasure of the power system 1 will be described.

Countermeasure Against Radio Noise

In the power system 1, as illustrated in FIG. 2, conductive rotation allowing members 70 having conductivity are provided between the left axle 3A and the case 4 and between the differential device 6 and the case 4. The conductive rotation allowing member 70 is a member which allows the rotation of rotating elements such as the left and right axles 3A and 3B and the differential device 6 with respect to the case 4 while feeding back the noise current transmitted to the rotating elements to the case 4 due to conductivity, and suppresses radiation noise from the axles 3A and 3B, the differential device 6, and the like.

In the embodiment, the conductive rotation allowing members 70 are the bearing 26 which supports the left axle 3A to be rotatable with respect to the end portion wall 41a of the first case 41 and the bearing 66 which supports the differential case 61 of differential device 6 to be rotatable with respect to the end portion wall 42a of the case 4.

Figure 3A:
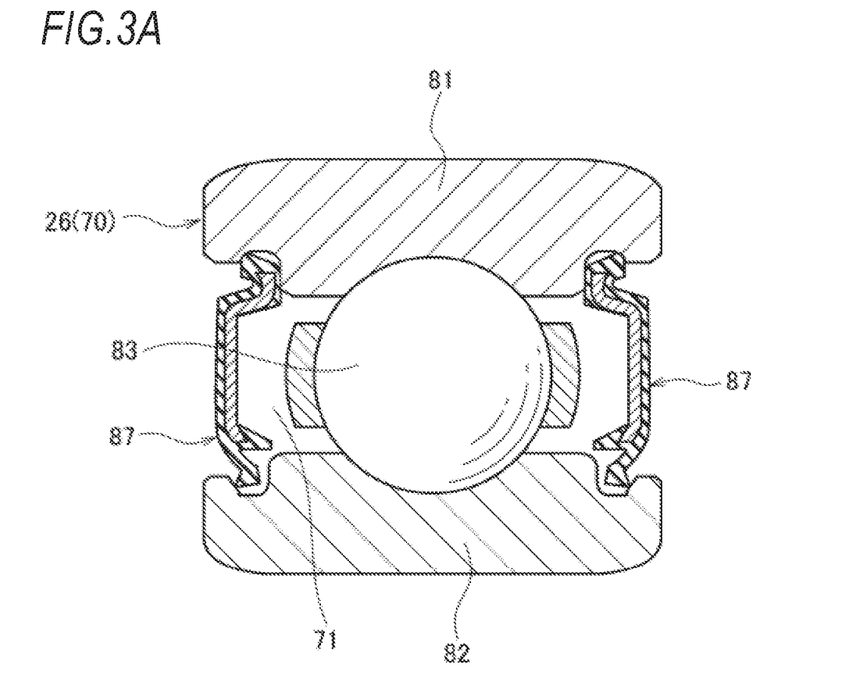
FIG. 3A is a cross-sectional view illustrating an example of a bearing as a conductive rotation allowing member.

The bearing 26 provided in the end portion wall 41a of the first case 41 is, for example, a sealed rolling bearing and is a deep-groove ball bearing which includes an outer ring 81, an inner ring 82, a plurality of balls 83 rolling between the outer ring 81 and the inner ring 82, and a pair of seal plates 87 as illustrated in FIG. 3A. In the bearing 26, conductive grease 71 is sealed in a bearing space surrounded by the pair of seal plates 87. Therefore, the noise current is transmitted to the case 4 via the left axle 3A, the inner ring 82, the conductive grease 71, and the outer ring 81 and the lubrication performance of the bearing 26 is maintained. Further, the seal plate 87 may be a conductive seal plate 84 in FIG. 3B, and in this case, the grease is not necessarily conductive.

Figure 3B:
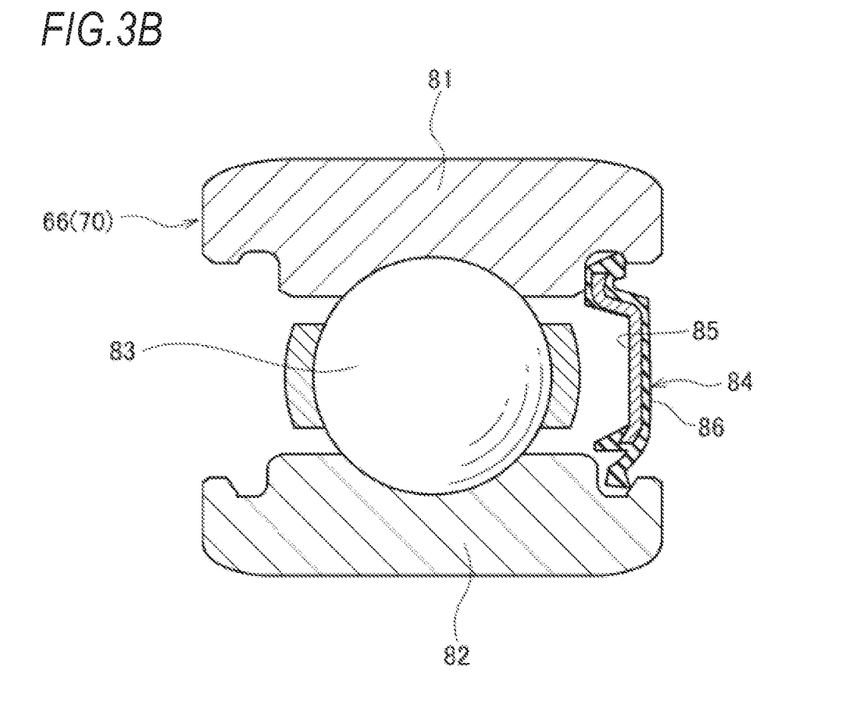
FIG. 3B is a cross-sectional view illustrating another example of the bearing as the conductive rotation allowing member.

The bearing 66 provided in the end portion wall 42a of the case 4 is, for example, a rolling bearing with a one-side seal and is a deep-groove ball bearing which includes an outer ring 81, an inner ring 82, a plurality of balls 83 rolling between the outer ring 81 and the inner ring 82, and a conductive seal plate 84 provided only on one side (a side opposite to the transmission 5 in the embodiment) as illustrated in FIG. 3B. In the conductive seal plate 84, an outer periphery of a metal core 85 is covered with an elastic member 86 made of conductive rubber. Therefore, the noise current is transmitted to the case 4 via the differential case 61 of the differential device 6, the inner ring 82, the conductive seal plate 84, and the outer ring 81. Also, since, in the bearing 66, the conductive seal plate 84 is provided only on a side opposite to the transmission 5, lubricating oil in the storage portion 44 scooped up with the rotation of the second gear 52 is supplied to the side of the transmission 5, whereby the lubricating performance of the bearing 66 is maintained.

In the embodiment described above, the bearing 26 and the bearing 66 are exemplified as the conductive rotation allowing member 70, but the bearing 65 may be the conductive rotation allowing member 70. Further, the oil seal 27, 28, or 29 may be the conductive rotation allowing member 70. Hereinafter, an oil seal as the conductive rotation allowing member 70 will be described with the oil seal 29 as an example.

Figure 4:
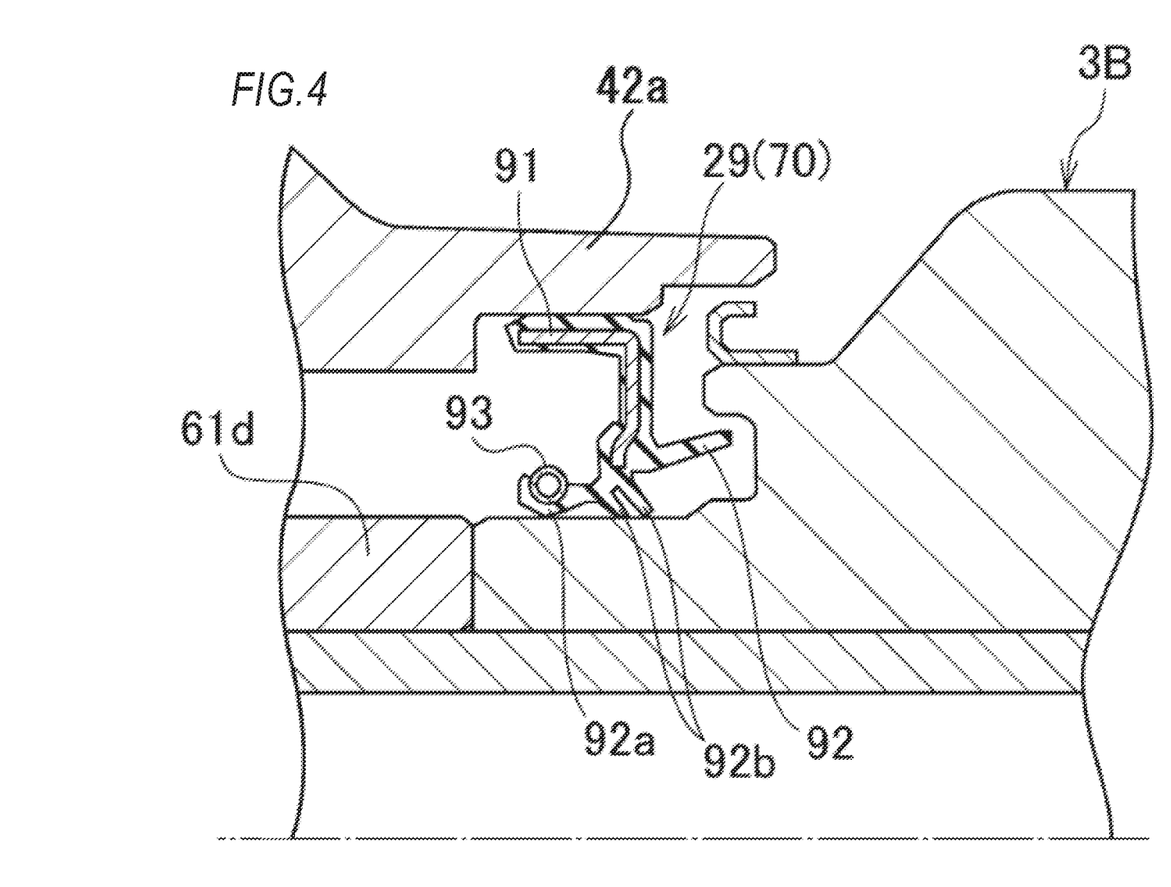
FIG. 4 is a cross-sectional view of a periphery of an oil seal as the conductive rotation allowing member.

As illustrated in FIG. 4, the oil seal 29 includes a core metal 91, an elastic member 92 which covers the core metal 91 and is made of conductive rubber including a main lip 92a and a sub-lip 92b, and a garter spring 93 mounted on an outer circumferential surface of the main lip 92a, and the main lip 92a is clamped in the radial direction with respect to the right axle 3B by the garter spring 93. As a result, the noise current is transmitted to the case 4 via the right axle 3B and the oil seal 29.

The invention is not limited to the embodiment described above and may be appropriately modified, improved, and the like.

For the power system 1, a forced lubrication method using an oil pump may be adopted instead of the lubrication method of scooping-up type or together with the lubricating method of scooping-up type.

At least the following matters are described in the specification. Although the corresponding constituent elements and the like in the above embodiment are described in parentheses, the present invention is not limited thereto.

(1) A power system (a power system 1) including:
an electric motor (an electric motor 2) for driving a left wheel (a left wheel WL) and a right wheel (a right wheel WR) of a vehicle (a vehicle V);
an electric motor control device (an inverter INV) for controlling the electric motor;
a transmission (a transmission 5) disposed on a power transmission path between the electric motor, the left wheel and the right wheel;
a differential device (a differential device 6) for distributing output decelerated by the transmission to the left wheel and the right wheel;
a case (a case 4) which accommodates the electric motor, the transmission, and the differential device;
a left axle (a left axle 3A) of which one end is connected to the differential device and the other end extends from the case to be connected to the left wheel; and
a right axle (a right axle 3B) of which one end is connected to the differential device and the other end extends from the case and connected to the right wheel, wherein
a conductive rotation allowing member (a conductive rotation allowing member 70) having conductivity is provided between at least one of the left axle and the right axle and the case, and
the conductive rotation allowing member is a bearing (a bearing 26) or an oil seal (an oil seal 27, 28, or 29).

According to (1), since the conductive rotation allowing member having conductivity is provided between the case and the axle, it is possible to prevent the noise generated from the electric motor control device from being radiated. Also, since the rotation of the axle is decelerated by the transmission, the influence of friction can be reduced. Further, since the conductive rotation allowing member is the bearing or the oil seal, it is possible to avoid an increase in the number of parts as a countermeasure against radio noise and maintenance is not necessary compared with a case of a sliding-contact brush.

(2) A power system (a power system 1) including:
an electric motor (an electric motor 2) for driving a left wheel (a left wheel WL) and a right wheel (a right wheel WR) of a vehicle (a vehicle V);
an electric motor control device (an inverter INV) for controlling the electric motor;
a transmission (a transmission 5) disposed on a power transmission path between the electric motor, the left wheel and the right wheel;
a differential device (a differential device 6) for distributing output decelerated by the transmission to the left wheel and the right wheel;
a case (a case 4) which accommodates the electric motor, the transmission, and the differential device;
a left axle (a left axle 3A) of which one end is connected to the differential device and the other end extends from the case to be connected to the left wheel; and
a right axle (a right axle 3B) of which one end is connected to the differential device and the other end extends from the case to be connected to the right wheel, wherein
a conductive rotation allowing member having conductivity is provided between the differential device and the case, and
the conductive rotation allowing member is a bearing (a bearing 66) or an oil seal.

According to (2), since the conductive rotation allowing member having conductivity is provided between the case and the differential device, it is possible to prevent the noise generated from the electric motor control device from being radiated. Also, since the rotation of the differential device is decelerated by the transmission, the influence of friction can be reduced. Further, since the conductive rotation allowing member is the bearing or the oil seal, it is possible to avoid an increase in the number of parts as a countermeasure against radio noise and maintenance is not necessary compared with a case of a sliding-contact brush.

(3) The power system according to (1) or (2), wherein
the conductive rotation reducing member is the bearing,
the bearing includes an outer ring (an outer ring 81), an inner ring (an inner ring 82), a plurality of balls (balls 83) rolling between the outer ring and the inner ring, and a seal plate (a conductive seal plate 84) provided on one axial side of the outer ring, and
the seal plate has conductivity and is provided on a side opposite to the transmission in an axial direction.

According to (3), since the seal plate having conductivity is provided on the side opposite to the differential device in the axial direction, there is no hindrance to the flow of lubricating oil supplied to the bearing from the side of the differential device, that is, the inside of the case. As a result, lubrication properties of the bearing can be maintained.

What is claimed is:
1. A power system comprising:
an electric motor for driving a left wheel and a right wheel of a vehicle;
an electric motor control device for controlling the electric motor;
a transmission disposed on a power transmission path between the electric motor, the left wheel and the right wheel;
a differential device for distributing output decelerated by the transmission to the left wheel and the right wheel;
a case which accommodates the electric motor, the transmission, and the differential device;
a left axle of which one end is connected to the differential device and the other end extends from the case to be connected to the left wheel; and
a right axle of which one end is connected to the differential device and the other end extends from the case to be connected to the right wheel, wherein
a storage portion which stores lubricating oil below the differential device is provided in the case,
a bearing is provided between at least one of the left axle and the right axle and the case as a conductive rotation allowing member having conductivity, and
the bearing is provided above the storage portion and includes an outer ring, an inner ring, a plurality of balls rolling between the outer ring and the inner ring, and a seal plate provided on one axial side of the outer ring.

2. The power system according to claim 1, wherein the transmission includes at least one gear configured to rotate and enable the lubricating oil within the storage portion to be scooped up with the rotation and supplied to the bearing.

3. A power system comprising:
an electric motor for driving a left wheel and a right wheel of a vehicle;
an electric motor control device for controlling the electric motor;
a transmission disposed on a power transmission path between the electric motor, the left wheel and the right wheel;
a differential device for distributing output decelerated by the transmission to the left wheel and the right wheel;
a case which accommodates the electric motor, the transmission, and the differential device;
a left axle of which one end is connected to the differential device and the other end extends from the case to be connected to the left wheel; and
a right axle of which one end is connected to the differential device and the other end extends from the case to be connected to the right wheel, wherein
a storage portion which stores lubricating oil below the differential device is provided in the case,
a bearing is provided between the differential device and the case as a conductive rotation allowing member having conductivity, and
the bearing is provided above the storage portion and includes an outer ring, an inner ring, a plurality of balls rolling between the outer ring and the inner ring, and a seal plate provided on one axial side of the outer ring.

4. The power system according to claim 3, wherein the transmission includes at least one gear configured to rotate and enable the lubricating oil within the storage portion to be scooped up with the rotation and supplied to the bearing.

* * * * *